(12) United States Patent
Golec

(10) Patent No.: US 11,718,368 B1
(45) Date of Patent: Aug. 8, 2023

(54) BICYCLE CHAINRING AND A BICYCLE COMPRISING THE BICYCLE CHAINRING

(71) Applicant: Marcin Golec, London (GB)

(72) Inventor: Marcin Golec, London (GB)

( * ) Notice: Subject to any disclaimer, the term of this patent is extended or adjusted under 35 U.S.C. 154(b) by 0 days.

(21) Appl. No.: 18/109,884

(22) Filed: Feb. 15, 2023

(30) Foreign Application Priority Data

Mar. 3, 2022 (EP) .................................... 22160058

(51) Int. Cl.
B62M 9/02 (2006.01)
B62M 9/00 (2006.01)

(52) U.S. Cl.
CPC ......... B62M 9/02 (2013.01); *B62M 2009/002* (2013.01)

(58) Field of Classification Search
CPC . F16H 55/30; F16H 7/06; B62M 9/10; B62M 9/105; B62M 9/00; B62M 9/02; B62M 2009/002
USPC .................................................. 474/152, 156
See application file for complete search history.

(56) References Cited

U.S. PATENT DOCUMENTS

| | | | | |
|---|---|---|---|---|
| 586,991 | A * | 7/1897 | Curley | F16H 55/30 474/228 |
| 3,969,947 | A * | 7/1976 | Martin | F16H 55/30 474/152 |
| 4,174,642 | A * | 11/1979 | Martin | F16H 55/30 474/152 |
| 6,203,462 | B1 * | 3/2001 | Takamori | F16H 7/06 474/160 |
| 8,888,631 | B2 * | 11/2014 | Morita | F16H 55/30 474/155 |
| 9,150,277 | B2 * | 10/2015 | Emura | B62M 9/131 |
| 9,182,027 | B2 * | 11/2015 | Reiter | B62M 9/00 |
| 9,316,302 | B2 * | 4/2016 | Braedt | F16H 55/30 |
| 9,328,814 | B2 * | 5/2016 | Wesling | B62M 9/10 |
| 9,394,986 | B2 * | 7/2016 | Pfeiffer | F16H 55/30 |
| 9,394,987 | B2 * | 7/2016 | Pfeiffer | F16H 55/30 |
| 9,404,565 | B2 * | 8/2016 | Pfeiffer | F16H 55/30 |
| 9,540,070 | B2 * | 1/2017 | Watarai | F16H 55/30 |
| 9,581,229 | B2 * | 2/2017 | Pfeiffer | B62M 9/105 |

(Continued)

FOREIGN PATENT DOCUMENTS

EP 0429007 A1 5/1991

*Primary Examiner* — Henry Y Liu
(74) *Attorney, Agent, or Firm* — Mark M. Friedman

(57) ABSTRACT

The present invention relates to a bicycle chainring (1) for engagement with a drive chain provided with rollers, the bicycle chainring (1) comprising: a plurality of teeth (2, 3) extending radially from a periphery of the chainring (1), wherein the plurality of teeth (2, 3) comprises a plurality of narrow teeth (3) and a plurality of wide teeth (2), wherein each tooth (2, 3) comprises a front flank (5) and a rear flank (6) with respect to a drive direction (DD) and two opposing side surfaces (9), wherein at least one side surface (9) of each wide tooth (2) comprises a protrusion (7) extending therefrom in an axial direction of the chainring (1), wherein each protrusion (7) comprises a respective groove (8) arranged halfway between a top land (10) of the respective wide tooth (2) and a root circle (11) of the respective wide tooth (2), wherein the groove (8) extends throughout the protrusion (7) in a direction substantially parallel to the top land (10). The invention further relates to a bicycle comprising the of the invention chainring (1).

15 Claims, 11 Drawing Sheets

(56) References Cited

U.S. PATENT DOCUMENTS

Figure 1:
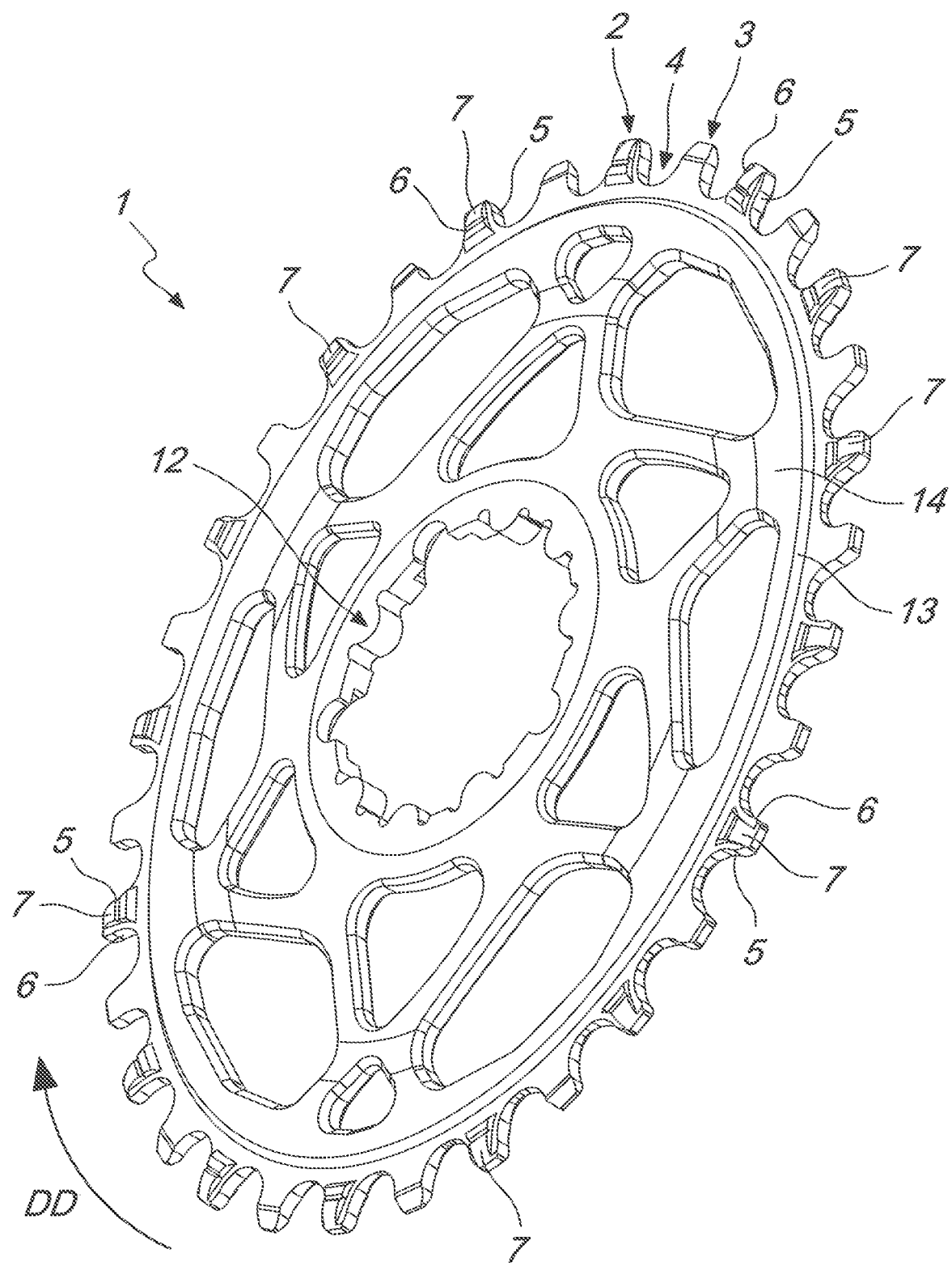

| | | | |
|---|---|---|---|
| 9,581,230 B2* | 2/2017 | Pfeiffer | F16H 55/30 |
| 9,581,231 B2* | 2/2017 | Pfeiffer | B62M 9/10 |
| 9,625,027 B2* | 4/2017 | Pfeiffer | B62M 9/10 |
| 9,701,364 B2* | 7/2017 | Sugimoto | B62M 9/105 |
| 9,719,590 B2* | 8/2017 | Reiter | B62M 9/10 |
| 9,873,481 B2* | 1/2018 | Braedt | B62M 9/121 |
| 9,964,196 B2* | 5/2018 | Sugimoto | F16H 55/30 |
| 10,247,291 B2* | 4/2019 | Akanishi | F16H 55/303 |
| 10,295,041 B2* | 5/2019 | Akanishi | F16H 55/30 |
| 10,358,186 B2* | 7/2019 | Sugimoto | B62M 9/105 |
| 10,359,106 B2* | 7/2019 | Akanishi | B62M 9/10 |
| 10,378,637 B2* | 8/2019 | Ooishi | B62M 9/10 |
| 10,451,166 B2* | 10/2019 | Winans | F16G 13/06 |
| 10,507,888 B2* | 12/2019 | Sugimoto | B62M 1/36 |
| 10,577,050 B2* | 3/2020 | Akanishi | B62M 9/12 |
| 10,578,201 B2* | 3/2020 | Reiter | B62M 1/36 |
| 10,808,824 B2* | 10/2020 | Sugimoto | B62M 9/10 |
| 11,203,395 B2* | 12/2021 | Watarai | F16H 55/30 |
| 11,300,192 B2* | 4/2022 | Staples | F16H 55/30 |
| 11,339,865 B2* | 5/2022 | Tavares Miranda | B62M 9/105 |
| 2005/0057097 A1* | 3/2005 | Wu | F16H 55/30 305/194 |
| 2007/0054768 A1* | 3/2007 | Miyazawa | F16H 55/30 474/152 |
| 2013/0139642 A1* | 6/2013 | Reiter | B62M 1/36 74/594.2 |
| 2013/0184110 A1* | 7/2013 | Reiter | F16H 55/30 474/152 |
| 2014/0338494 A1* | 11/2014 | Sugimoto | B62M 9/10 474/158 |
| 2014/0364259 A1* | 12/2014 | Reiter | F16H 55/30 474/155 |
| 2015/0198231 A1* | 7/2015 | Emura | F16H 7/06 474/156 |
| 2015/0226305 A1* | 8/2015 | Pfeiffer | B62M 9/105 474/152 |
| 2015/0226306 A1* | 8/2015 | Pfeiffer | B62M 9/105 474/152 |
| 2015/0226307 A1* | 8/2015 | Pfeiffer | F16H 7/06 474/152 |
| 2015/0226308 A1* | 8/2015 | Pfeiffer | B62M 9/105 474/152 |
| 2015/0285362 A1* | 10/2015 | Pfeiffer | F16H 55/30 474/152 |
| 2015/0285363 A1* | 10/2015 | Pfeiffer | B62M 9/10 474/152 |
| 2015/0285364 A1* | 10/2015 | Pfeiffer | B62M 9/10 474/152 |
| 2016/0208903 A1* | 7/2016 | Goates | B62M 9/105 |
| 2016/0238122 A1* | 8/2016 | Medaglia | B62M 9/10 |
| 2016/0298752 A1* | 10/2016 | Winans | F16G 13/06 |
| 2017/0101159 A1* | 4/2017 | Watarai | B62M 9/10 |
| 2017/0167542 A1* | 6/2017 | Hara | F16D 3/065 |
| 2017/0234418 A1* | 8/2017 | Barefoot | F16H 55/30 474/156 |
| 2018/0170480 A1* | 6/2018 | Braedt | B62M 9/121 |
| 2018/0186429 A1* | 7/2018 | Nakamura | B62M 9/1242 |
| 2018/0194431 A1* | 7/2018 | Iwai | B62M 9/10 |
| 2018/0265168 A1* | 9/2018 | Yokoi | B62M 9/105 |
| 2018/0363752 A1* | 12/2018 | Chin | B62M 9/00 |
| 2019/0195331 A1* | 6/2019 | Hanke | B62M 9/02 |
| 2019/0277386 A1* | 9/2019 | Hirose | F16H 55/30 |
| 2019/0359286 A1* | 11/2019 | Ichikawa | B62M 9/105 |
| 2020/0063850 A1* | 2/2020 | Tavares Miranda | B62M 9/06 |
| 2020/0166114 A1* | 5/2020 | Staples | F16H 55/30 |

* cited by examiner

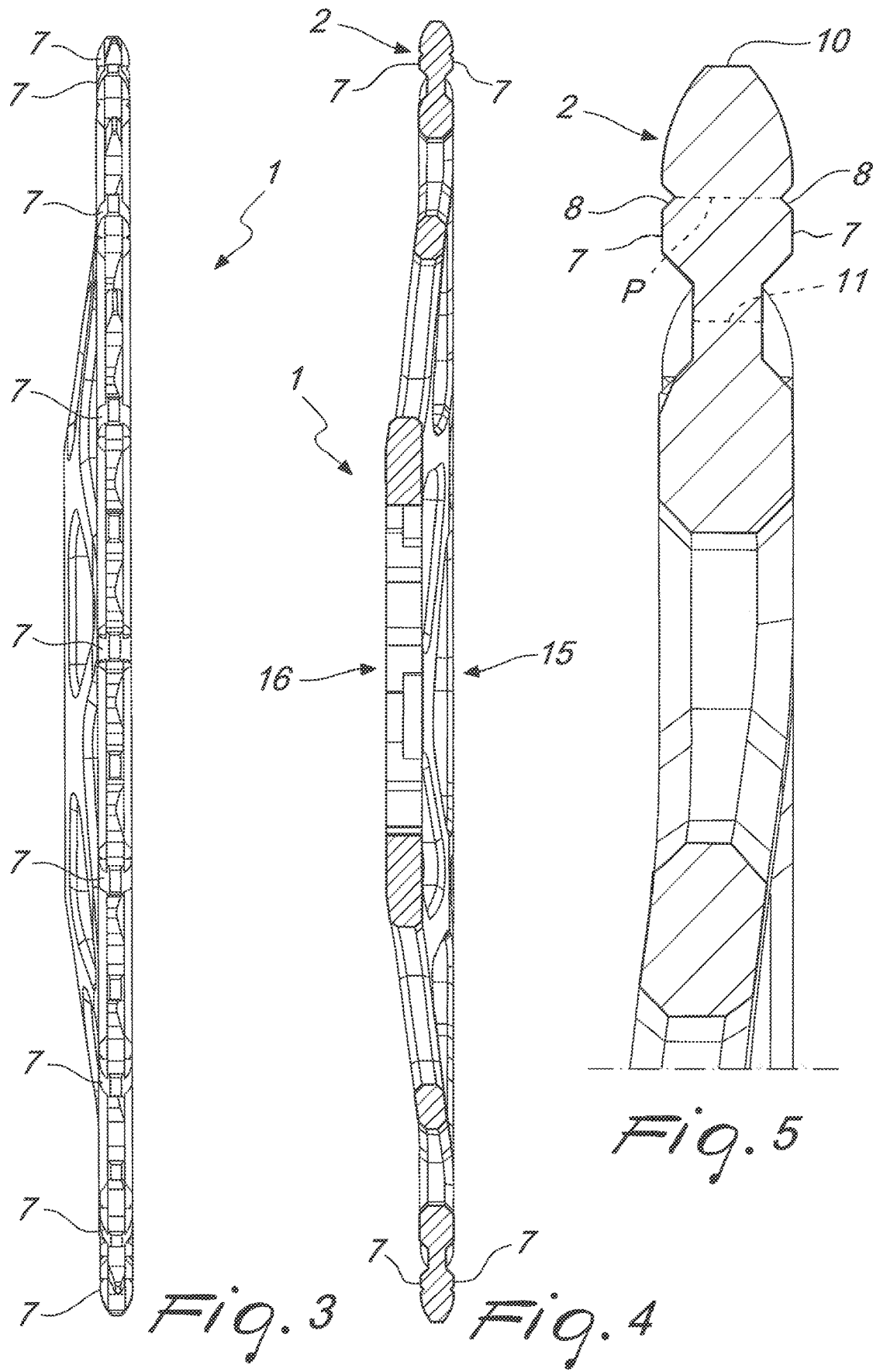

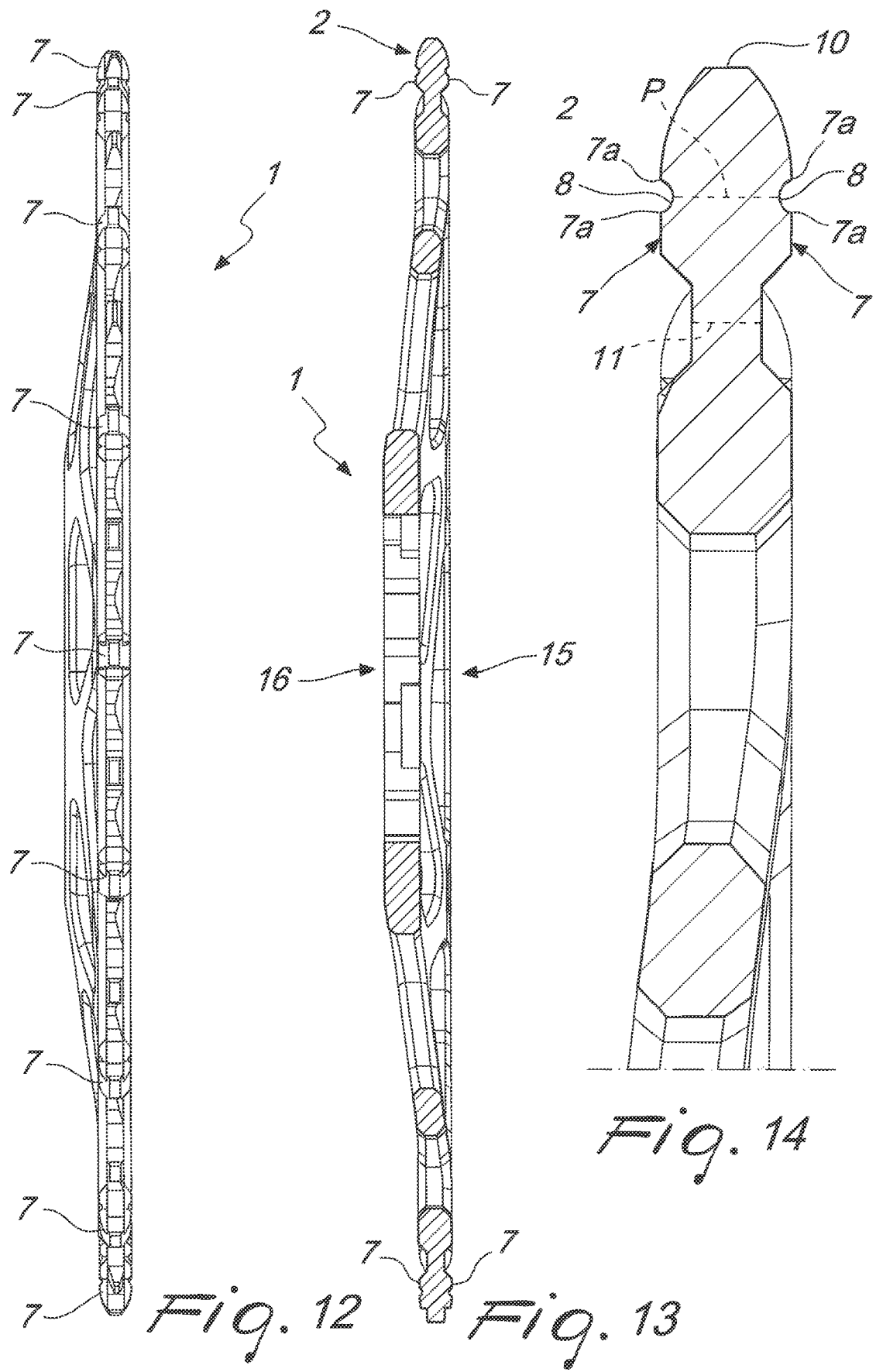

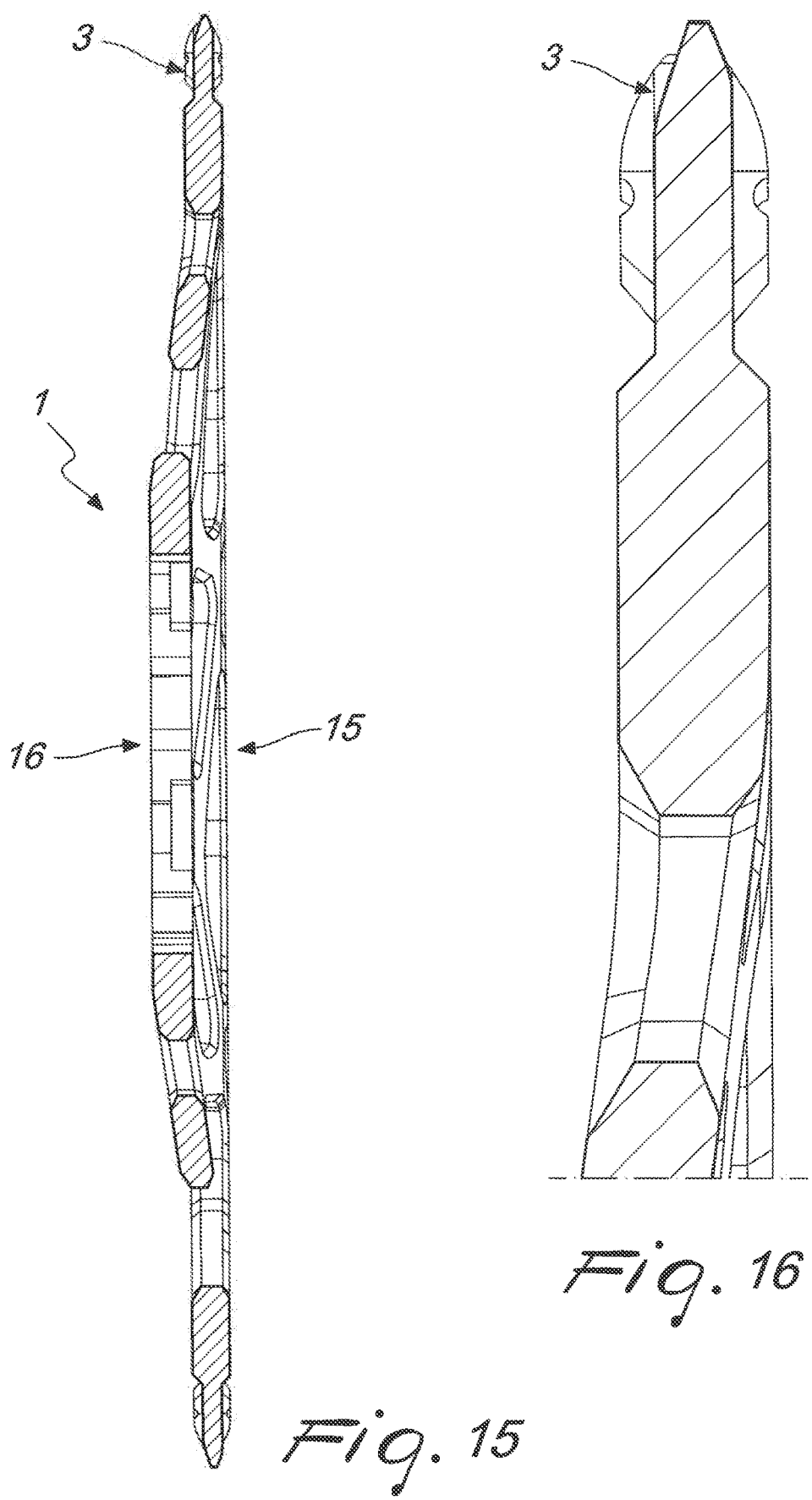

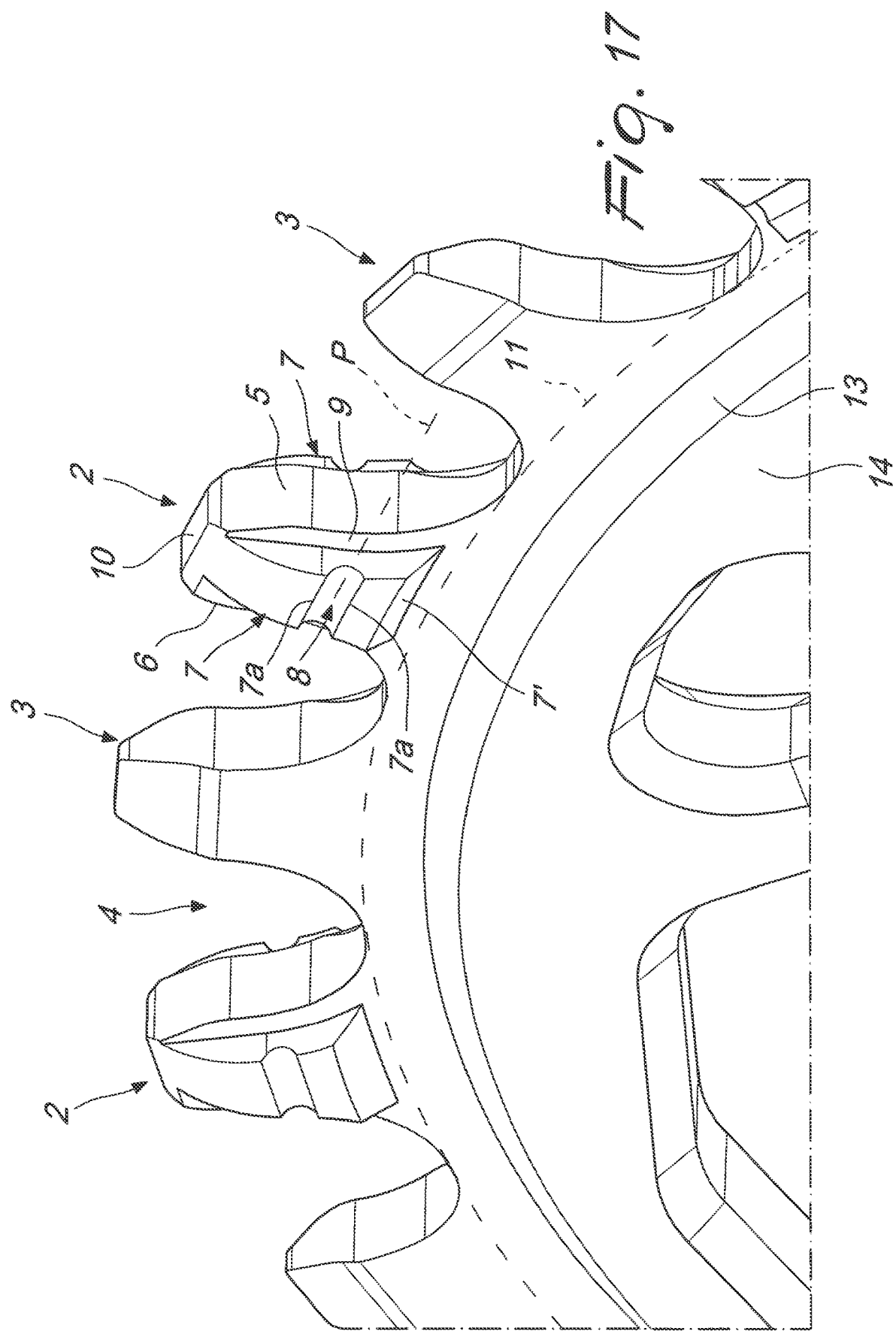

BICYCLE CHAINRING AND A BICYCLE COMPRISING THE BICYCLE CHAINRING

The present Invention relates to an improved bicycle chainring for engagement with a drive chain provided with rollers. Furthermore, the invention relates to a bicycle comprising the improved bicycle chainring.

It is known from the prior art that chainrings may comprise alternating wide and narrow teeth. Wide teeth known from prior art may comprise a protrusion rendering them wider than the corresponding narrow teeth. Between the teeth, a space or valley is provided.

The document JP S56-42489 U for example discloses a chainring for a bicycle, wherein a plurality of wide and narrow teeth is arranged circumferentially at the outer periphery of the chainring. The narrow and wide teeth are arranged to alternate. The wide teeth comprise an outline roughly in the shape of a plus sign while the narrow teeth comprise an outline roughly in the shape of a minus sign. The chainring according to JP S56-42489 U has a shortcoming, in the mud may deposit in the chain links of the drive chain and as a consequence, the drive chain may quicky drop from the chainring, in particular if the chainring is used off-road.

Another chainring is known from EP 2 602 176 A1. This document discloses a solitary chainring of a bicycle front crankset for engaging a drive chain, including a plurality of teeth formed about a periphery of the chainring, the plurality of teeth consisting of an even number. The plurality of teeth includes a first group of teeth and a second group of teeth arranged alternatingly between the first group of teeth. The first group of teeth and the second group of teeth are equal in number. Each of the first and second group of teeth include an outboard side and an inboard side opposite the outboard side. Each tooth of the first group of teeth includes a protrusion on the outboard and/or inboard side thereof and thus from wide teeth. Each tooth of the second group of teeth are free protrusions on both the outboard side and the Inboard side and form thus narrow teeth. Further, EP 2 602 176 A1 teaches to fill the largest possible space between the chain links of the drive chain with the teeth of the first group of teeth. However, the solution of EP 2 602 176 A1 still does not provide for a satisfactory solution to the problem of mud deposition in the chain links of the drive chain and as a consequence, the drive chain may easily drop from the chainring, in particular is used off-road.

It is therefore an object of the present invention to at least partially overcome the disadvantages described above. In particular, it Is an object of the present invention, to provide an improved bicycle chainring, preferably suitable for rugged or muddy terrain.

The above object and further objects which will become apparent hereinafter are solved by a bicycle chainring with the features of claim 1 and by a bicycle with the features of claim 15. Further advantageous features and details of the Invention are disclosed in the respective dependent claims.

Features and details described in connection with the Inventive bicycle chainring also apply to the inventive bicycle, and vice versa, so that with respect to the disclosure concerning the individual aspects of the Invention reference can always be made mutually.

According to the invention, there is provided a bicycle chainring for engagement with a drive chain provided with rollers, the bicycle chainring comprising:

a plurality of teeth extending radially from a periphery of the chainring, wherein the plurality of teeth comprises a plurality of narrow teeth and a plurality of wide teeth, wherein each tooth has a front flank and a rear flank with respect to a drive direction and two opposing side surfaces, as seen in the axial direction of the chainring, wherein at least one side surface of each wide tooth comprises a protrusion extending therefrom in an axial direction of the chainring, wherein each protrusion comprises a groove arranged halfway between a top land of the respective wide tooth and a root circle of the respective wide tooth, wherein the groove extends throughout the protrusion in a direction substantially parallel to the top land.

In the present specification, whenever the terms "radial direction" and "axial direction" are respectively used, they intend the radial and the axial directions of the bicycle chainring.

In the present specification, the wording—a groove arranged halfway between a top land of the respective wide tooth and a root circle of the respective wide tooth in a direction substantially parallel to the top land—is used to designate a groove extending throughout the protrusion such that the edges of the protrusion delimiting the groove are located about a plane extending substantially halfway between the top land of the respective wide tooth and the root circle of the respective wide tooth. Preferably, the edges of the protrusion delimiting the groove are centered about said plane.

Furthermore, in the context of the present specification, indefinite and definite articles or numerical indications, e.g., "one", "two", etc., are always to be understood as "at least" Indications, unless expressly stated otherwise. Furthermore, numerical indications as well as indications of process parameters and/or device parameters are to be understood in the technical sense, i.e., as having the usual tolerances. Also, from the explicit indication of "at least" or the like it must not be concluded that by the simple use of the article or the numerical Indication, i.e., without the indication of "at least" or the like, a restriction, e.g., in the sense of "exactly one", is to be implied.

A bicycle chainring in the context of the present specification includes means for engaging with the drive chain of a bicycle to transfer power to a wheel. For this purpose, the chainring comprises teeth being spaced to engage every chain link of the drive chain as it passes over, but it may also have one tooth for every other link of the chain. The chainring may be made of or comprise aluminum alloy, titanium, steel, and/or a composite reinforced with carbon fiber. The terms "chainring" and "bicycle chainring" may be understood synonymously and may be used interchangeably throughout the specification.

The teeth of the chainring comprise a plurality of wide teeth and narrow teeth wherein the wide teeth are widened in an axial direction of the bicycle chainring as compared to the narrow teeth.

A valley in the context of the present specification is a space that is present between two consecutive teeth of the chainring.

A front flank according to the present specification is to be understood as the flank of a respective tooth that is first engaging a roller of the chain links of the drive chain while the chainring is moving in a drive direction. A rear flank is to be understood as the flank of a respective tooth that is facing the opposite direction of the front flank. Front and rear flanks as envisaged as flanks as seen in the tangential direction of the chainring.

A protrusion in the context of the specification stands for an extent or an amount of material extending from the chainring. The protrusion may be directly formed while producing the bicycle chainring or it may be affixed to the bicycle chainring in a different production step. The protrusion may comprise the same type of material as the bicycle chainring or a different type of material.

The term groove is to be understood in the context of the present specification as an opening or a gap within the protrusion. In other words, the protrusion lacks material where the groove is present.

A side surface in the context of the present specification stands for a surface that is present on each tooth, as seen in the axial direction, wherein the normal vector of the side surface points towards an inboard side or towards an outboard side of the bicycle chainring. The inboard side points towards the bicycle and the outboard side points away from the bicycle.

A top land in the context of the present specification is to be understood as a surface that is present at an outmost boundary of each tooth, wherein said outmost boundary is furthest away from a center of the chainring.

A root circle describes a closed curve around the chainring, into which the plurality of teeth is rooted in and extends outwards therefrom. The root circle according to the present specification is to be understood a curve arranged to be substantially tangent to the respective maximum depths of the valleys between the teeth of the chainring. In the case of a circular chainring the root circle has substantially a circular shape while being substantially tangent to the respective maximum depths of the valleys between the teeth of the chainring. In an elliptic chainring the root circle substantially follows the elliptical form while being substantially tangent to the respective maximum depths of the valleys between the teeth of the chainring.

According to the invention, the groove in the at least one protrusion provides the technical effect of clearing mud from the drive chain of the bicycle in order to provide a reduced wear and an improved functionality, particularly in muddy conditions. The groove also leads to a reduced likelihood of the drive chain dropping from the chainring while the bicycle is moving.

The groove according to the invention extends throughout the protrusion in a direction substantially parallel to the top land of a tooth. The terms "substantially parallel" or "parallel should be understood in that deviations within manufacturing tolerances are acceptable. Furthermore, the terms "substantially parallel" or "parallel" are Intended to cover a groove describing a straight line or a curved One or a cornered line, wherein a straight line is preferred. Also, the terms "substantially parallel" or "parallel" are intended to describe in the context of the present specification slightly angled grooves as compared to the mathematically parallel to the top land.

According to an advantageous aspect of the invention It is possible that each side surface of each wide tooth comprises a respective protrusion. The two respective protrusions on each side of each wide tooth may be shaped and sized similarly or differently, wherein a similar shape and size, i.e. a symmetrical size as seen in the tangential direction of the chainring, of the respective protrusions is preferred.

According to the invention each protrusion comprises a respective groove arranged halfway between the top land of the respective wide tooth and the root circle of the respective wide tooth and extending throughout the protrusions in a direction substantially parallel to the top land, wherein preferably the grooves in the opposing side surfaces of a wide tooth are equally sized. Alternatively, the grooves in the opposing side surfaces are differently sized and/or shaped. Furthermore, it also may be conceivable that all grooves at the outboard side of the chainring are equally sized and all grooves at the inboard side are equally sized, wherein the grooves at the outboard side are differently sized and/or shaped from the grooves at the inboard side. In the most preferred embodiment, in terms of manufacturing constraints, all grooves are identical.

The groove may be advantageously shaped in a circular, an elliptical, a triangular, a trapezoidal or a rectangular form in cross-section, as seen in a tangential direction of the chainring, wherein the groove is preferably shaped in a triangular form. The form of the groove may advantageously have throughout the protrusions, as seen in a tangential direction of the chainring, a symmetrical form about a plane extending halfway between the top land of the respective wide tooth and the root circle of the respective wide tooth. It should be noted that the list of different forms described above is not limited to those described above and that that the person skilled in the art may envisage using alternative forms like one having more than 4 straight sides in cross-section or combinations or circular and straight outlines.

The groove may be defined with a radial width between two edges delimiting the groove in the radial direction and an axial depth in the axial direction at a deepest point of the groove, as compared to the delimiting edges of the protrusion, wherein preferably the radial width is constant throughout the extension of the groove in the protrusion. Nevertheless, in a further preferred option, the radial width may vary and thus the delimiting edges will follow the variation of the radial width. In case of a rectangular groove, the axial depth is obviously the same throughout the extension of the groove.

It may have an advantage if a ratio between the radial width of the groove and the axial depth of the groove is between 2 to 1 and 3 to 1. In other words, the ratio may vary so that at a minimum the radial width of the groove may equal two times the axial depth of the groove and at a maximum the radial width of the groove may equal three times the axial depth of the groove. This range of the ratio may be especially advantageous with regard to the technical effect of clearing the drive chain from mud.

The protrusion may have an axial height at the edges delimiting the groove in the radial direction, wherein the axial depth of the groove is at least 30% of the axial height of the protrusion, preferably about 40% of the axial height of the protrusion. It may further be provided that the axial depth of the groove may be up to 70% of the axial height of the protrusion. In other words, the groove may be equivalent to a cutout in the protrusion so that said cutout at its deepest point equals an amount of 30%, preferably 40%, and in particular up to 70% of the axial height of the protrusion at the edges of the protrusion delimiting the cutout. Further preferred ranges are from at least 40% up to 70% or from at least 30% to 60%.

The groove may advantageously have a symmetrical cross-section, as seen in the tangential direction of the chainring, wherein advantageously the axial depth of the groove (i.e. the depth at the deepest point of the groove as compared to the edges of the protrusion delimiting to the groove) is in a position about halfway between the top land of the respective wide tooth and the root circle of the respective wide tooth. In an alternative, the groove may also have an asymmetrical shape in cross section. If the groove is embodied with a straight rectangular cross-section, the axial depth is the same throughout the bottom of the groove and in this case the cross-section of the groove may be symmetrical about a plane extending about halfway between the top land of the wide tooth and the root circle of the wide tooth.

Optionally, the plurality of teeth comprises an even number of teeth. In other words, an addition of the number of wide teeth with the number of narrow teeth may equal an even number. The total number of teeth may vary between 20 and 60 teeth, wherein a provision of less or more teeth is also possible.

It may be advantageous if the plurality of wide teeth and the plurality of narrow teeth are arranged in an alternating manner, wherein preferably each wide tooth is followed by a narrow tooth and/or each narrow tooth is followed by a wide tooth. In other words, it may be provided that any narrow tooth is followed by a wide tooth and vice versa so that the type of tooth is changing in every step.

It is possible that a plurality of wide teeth and a plurality of narrow teeth are arranged in an alternating manner, wherein for instance each wide tooth is followed by three narrow teeth. The total number of teeth may be provided to match this type of alternation, i.e., as a whole multiple of 4. It is also possible that the alternation is varied, i.e., that an alternation of each wide tooth being followed by a narrow tooth is followed by an alternation of each wide tooth being followed by three narrow teeth.

It may have an advantage if the chainring is embodied as circular or oval. The circular or oval form may be present, as seen in an axial direction. The terms circular or oval may imply a small deviation of the circular or oval form to an outline of the chainring like a sinuous or cornered or polygonal outline of the chainring. Furthermore, the chainring being circular or oval may refer to the outline of the chainring without the plurality of teeth.

It may further be conceivable that the chainring is planar or domed. The terms planar and domed are referring to an axial extension of the chainring as seen in the radial direction. If the chainring is domed, the same may describe a form of the chainring comprising a concavity in a middle area of the chainring, the concavity pointing in particular towards the inboard side of the chainring.

It may be provided that at least one and preferably all protrusions comprise a chamfer facing the root circle. In other words, the protrusions may comprise an edge, especially a straight edge, starting from the root circle or from the proximity of the root circle and ending at a point below the edges of the groove or even extending up to the edge of the grove.

Another aspect of the invention pertains to a bicycle comprising a bicycle chainring according to the invention. Thus, the inventive bicycle brings about the same advantages as have been described in detail with reference to the inventive bicycle chainring.

Figure 2:
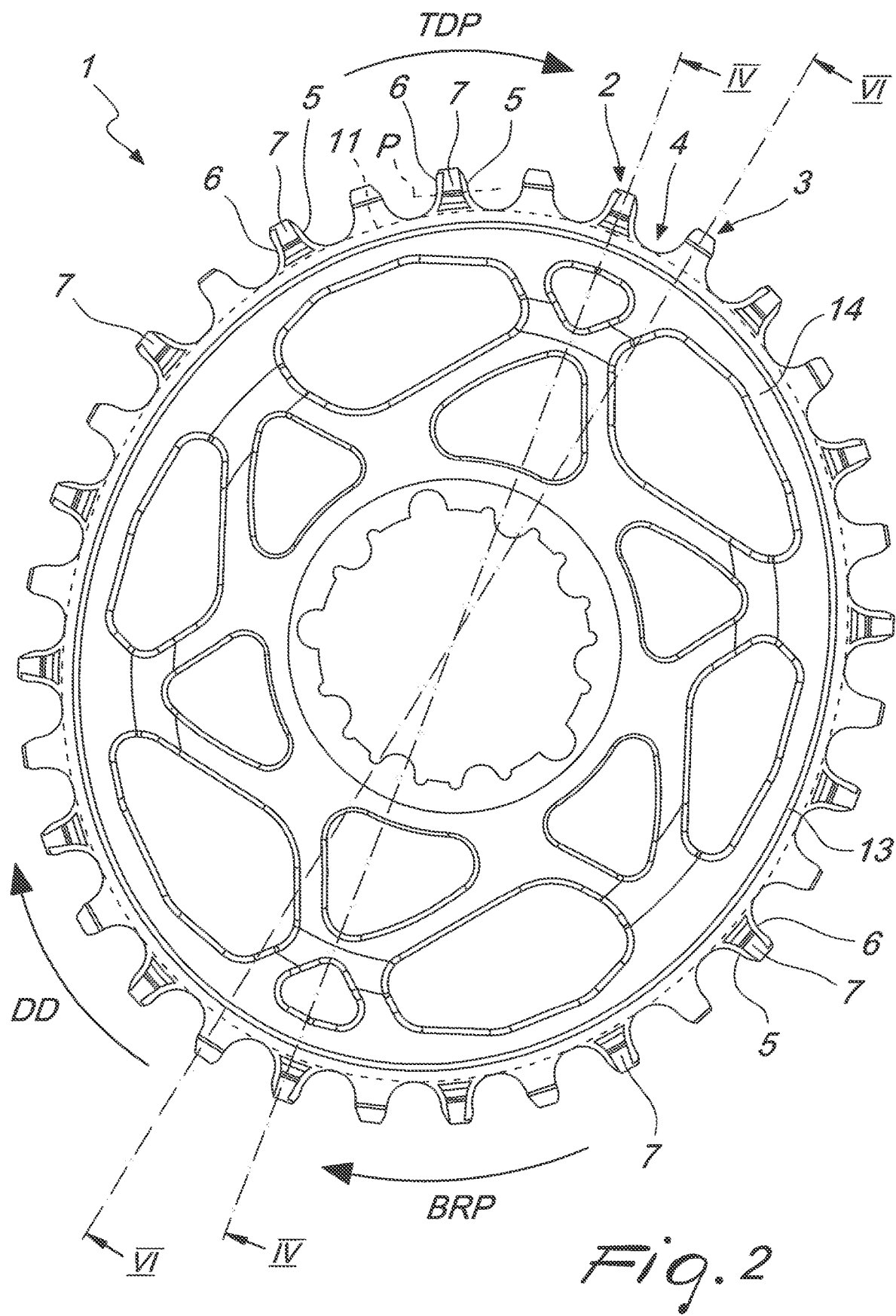
Figures 6, 7:
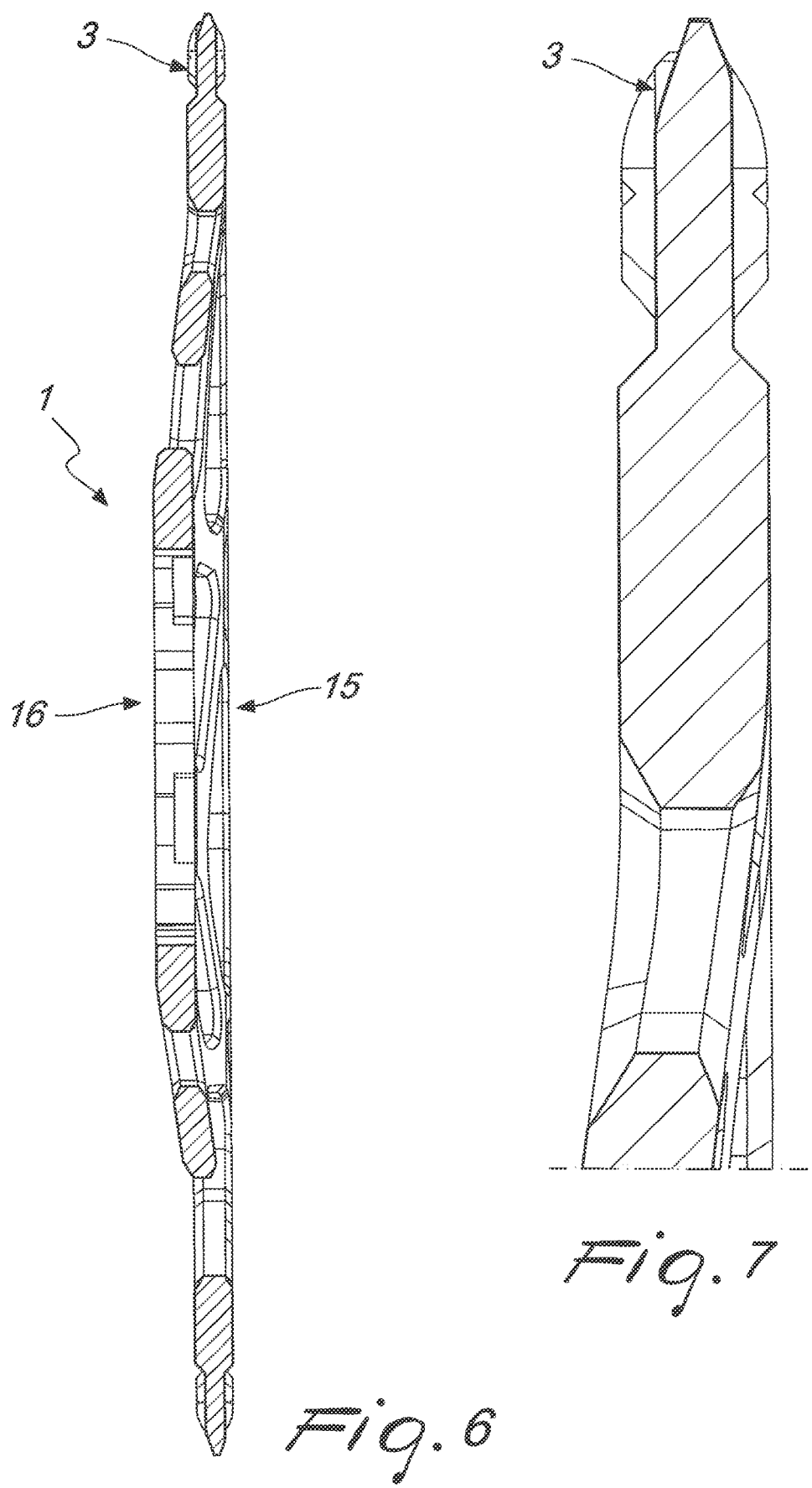
Figure 8:
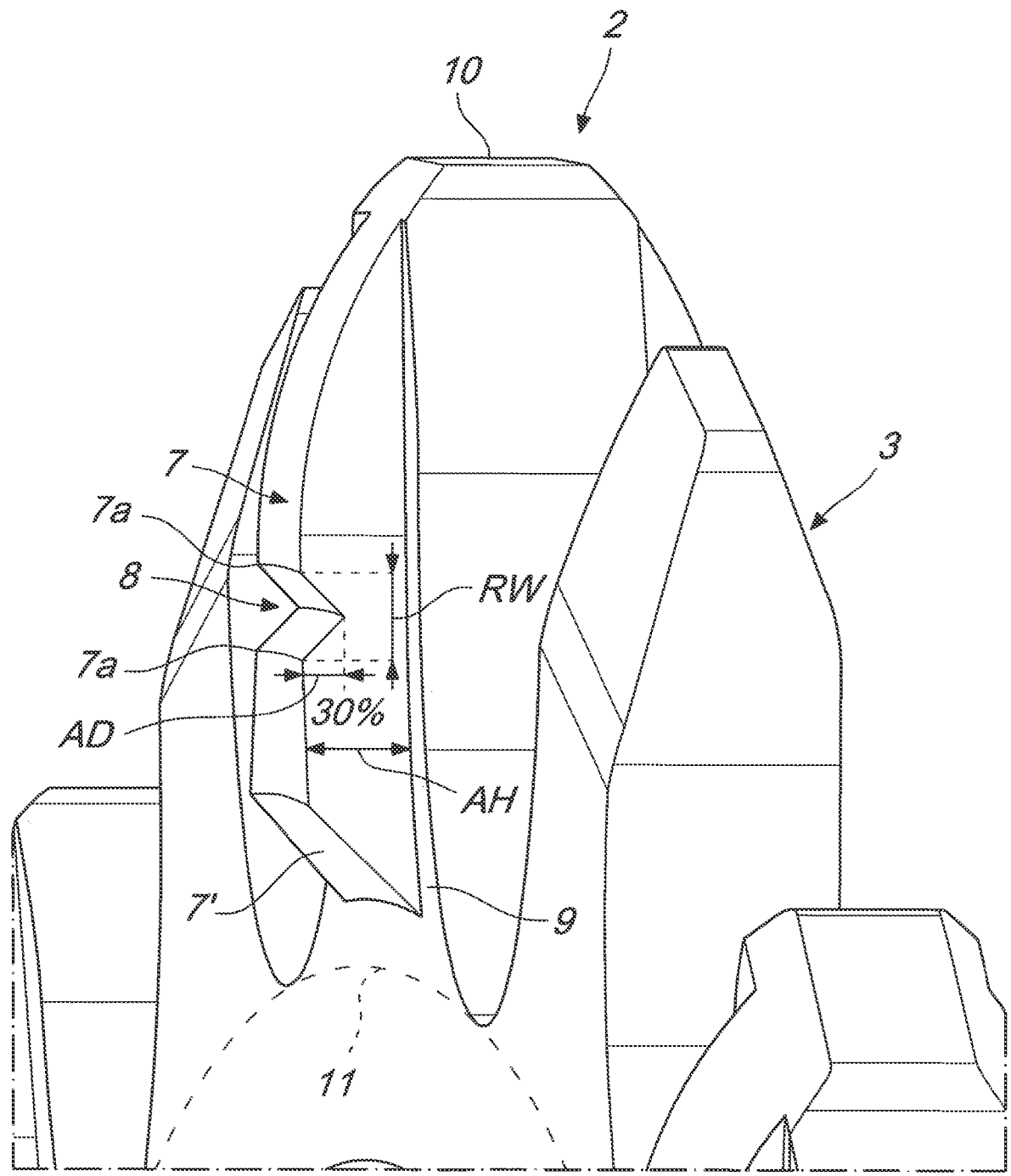
Figure 9:
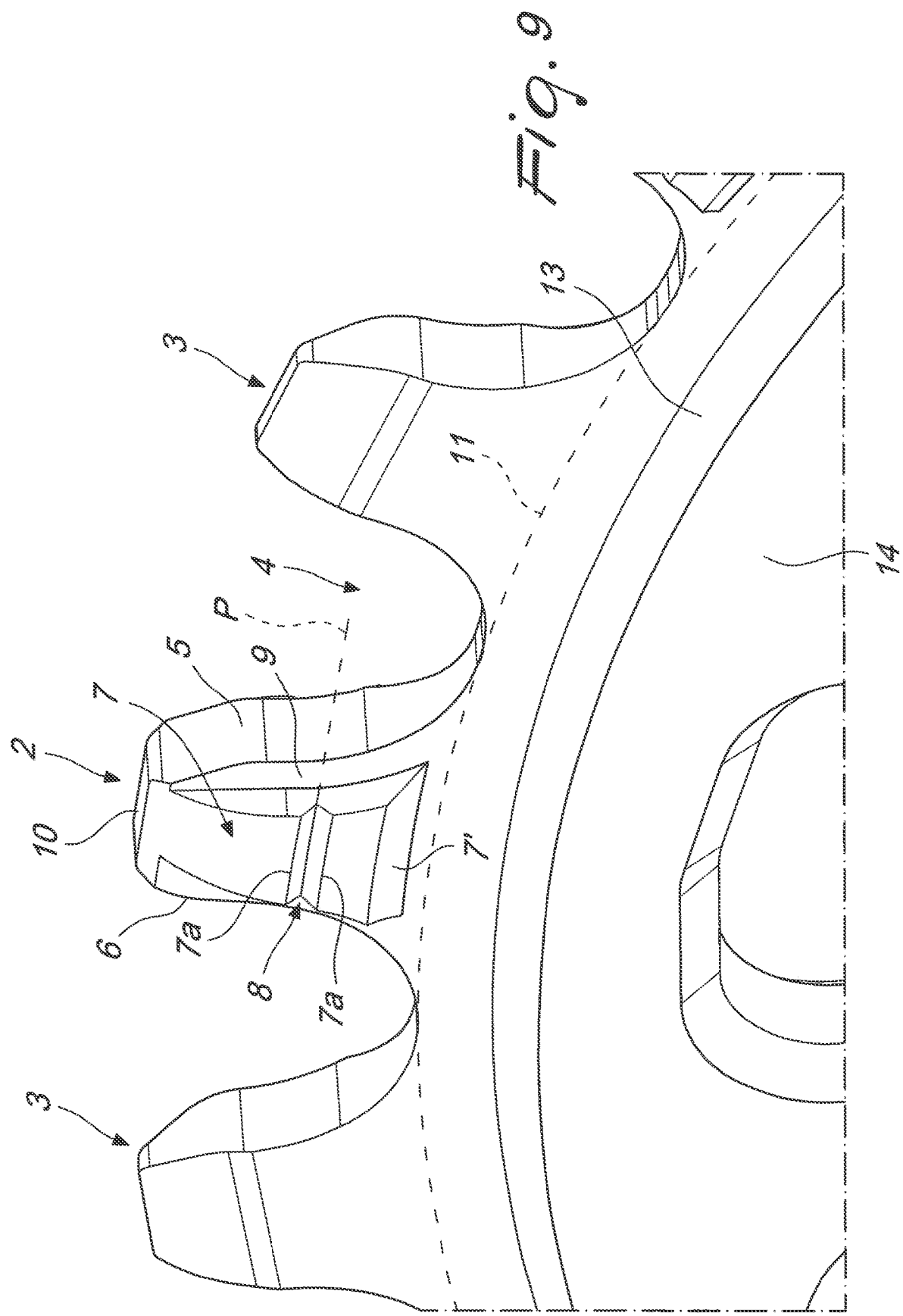
Figure 10:
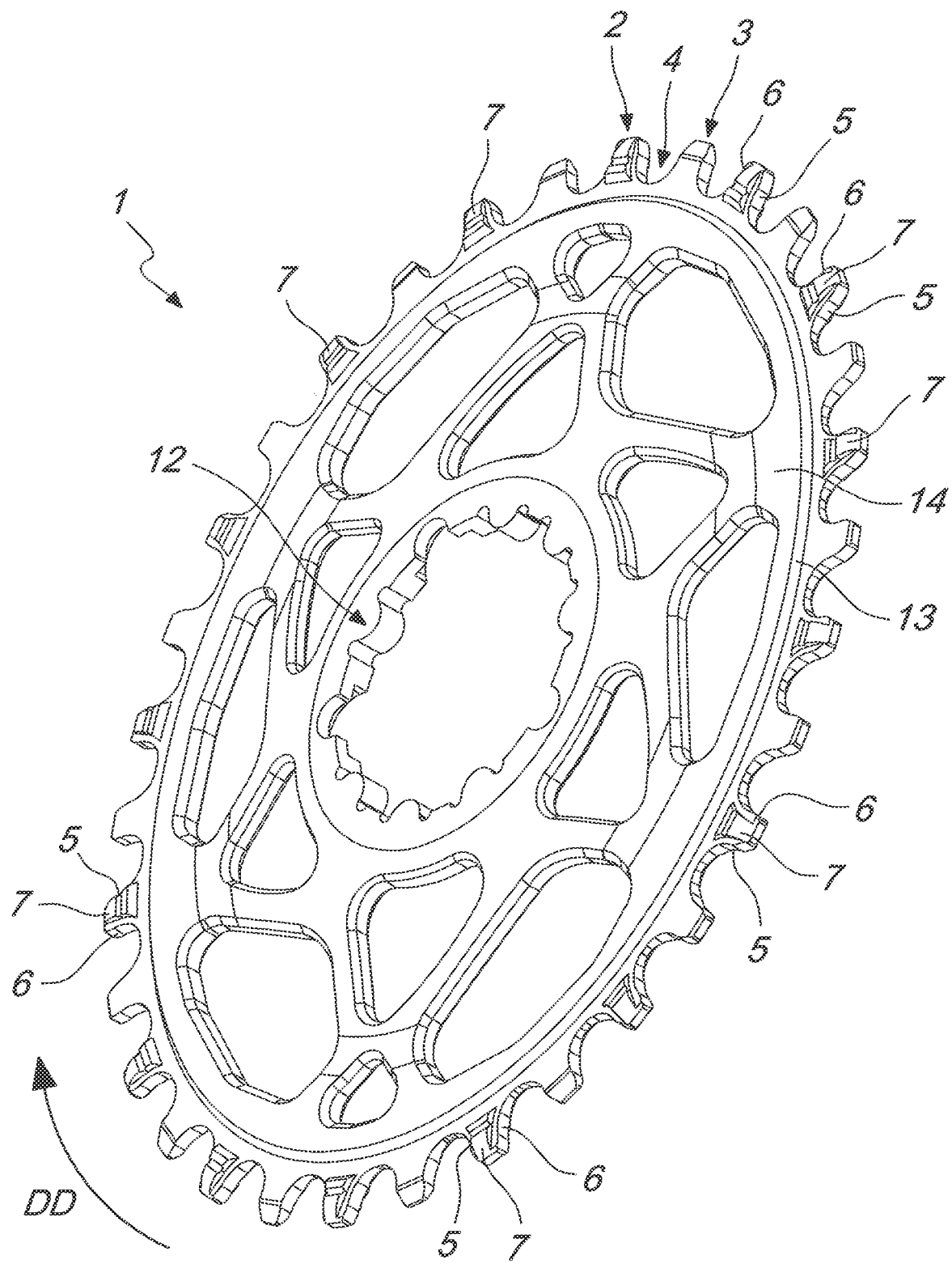
Figure 11:
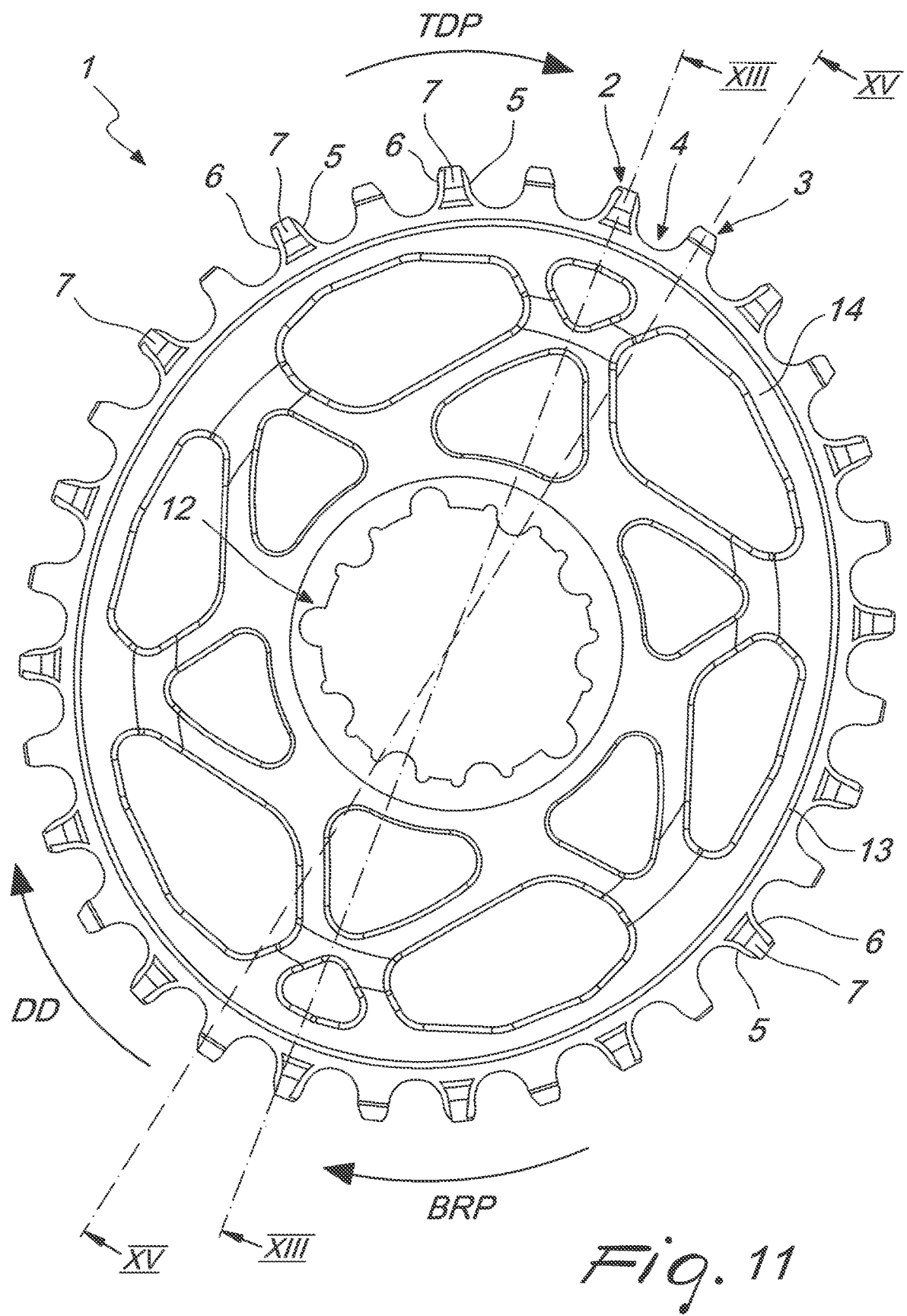

Further advantages, features and details of the invention will be apparent from the following description, in which embodiments of the invention are described in detail with reference to the drawings. In this connection, the features mentioned in the claims and in the description may each be essential to the Invention individually or in any combination. The drawings show as follows:

FIG. 1 a perspective view of a first embodiment of the bicycle chainring;

FIG. 2 a front view of the bicycle chainring of FIG. 1;

FIG. 3 a side view of the bicycle chainring of FIG. 1;

FIG. 4 a sectional view of the arrangement of FIG. 1 along the line IV-IV in FIG. 2;

FIG. 5 an enlarged view of an upper part of FIG. 4;

FIG. 6 a sectional view of the arrangement of FIG. 1 along the line VI-VI in FIG. 2;

FIG. 7 an enlarged view of an upper part of FIG. 6;

FIG. 8 an enlarged perspective view of the arrangement of FIG. 1 with particular emphasis on a wide tooth;

FIG. 9 another enlarged perspective view of the arrangement of FIG. 1 with particular emphasis on a wide tooth;

FIG. 10 a perspective view of a second embodiment of the bicycle chainring;

FIG. 11 a front view of the bicycle chainring of FIG. 10;

FIG. 12 a side view of the bicycle chainring of FIG. 10;

FIG. 13 a sectional view of the arrangement of FIG. 10 along the line XIII-XIII in FIG. 12;

FIG. 14 an enlarged view of an upper part of FIG. 13;

FIG. 15 a sectional view of the arrangement of FIG. 10 along the line XV-XV in FIG. 11;

FIG. 16 an enlarged view of an upper part of FIG. 15; and

FIG. 17 an enlarged perspective view of the arrangement of FIG. 10 with particular emphasis on a wide tooth.

EMBODIMENTS OF THE INVENTION

With reference to FIGS. 1 to 9, a first embodiment of a chainring 1 for a bicycle is described. As show, the bicycle chainring 1 is embodied as an oval chainring. However, as discussed above, the chainring can be embodied with a variety of shapes, including a circular shape, and the description below is applicable accordingly.

The bicycle chainring 1 in this embodiment comprises a plurality of teeth 2, 3 and more specifically a plurality of wide teeth 2 and a plurality of narrow teeth 3. Each tooth of the plurality of wide teeth 2 comprises at least one and preferably two protrusions 7 extending respectively from both side surfaces 9 of the chainring 1, the extension being in an axial direction of the chainring 1. In this embodiment, the chainring 1 comprises an even number of teeth 2, 3 and an alternation between the teeth, wherein each wide tooth 2 is followed by a narrow tooth 3 and each narrow tooth 3 is followed by a wide tooth 2. The chainring 1 is preferably domed towards an Inboard side 16 of the chainring 1 as can be seen in FIGS. 3, 4 and 6. The outboard side Is indicated with reference numeral 15 in FIG. 4.

With reference to FIGS. 5 and 8, in every protrusion 7, a groove 8 shaped in a triangular form in cross-section is provided, the groove 8 being arranged halfway between a top land 10 of the respective wide tooth 2 and a root circle 11 of the respective wide tooth 2. The term "arranged halfway between", as above, designates a groove 8 extending throughout the protrusion 7, as shown particularly in FIGS. 5 and 8, such that the edges 7*a* of the protrusion 7 delimiting or adjacent to the groove 8 are located about a plane P extending halfway between the top land 10 of the respective wide tooth 2 and the root circle 11 of the respective wide tooth 2. Preferably, the edges 7*a* of the protrusion 8 delimiting the groove 8 are centered about said plane P.

The groove 8 extends throughout the protrusion 7 in a direction substantially parallel to the top land 10. The grooves 8 in the protrusions 7 on the respective side surfaces 9 of a respective wide tooth 2 are preferably equally sized and positioned on the respective protrusions 7, as show in FIG. 5. The grooves 7 may also be symmetrical with respect to a not shown plane bisecting the wide tooth 2. Furthermore, all wide teeth 2 may preferably have an identical set of protrusions 7 with grooves 8 on the inboard side 15 and a mirrored identical set of protrusions 7 with grooves 8 on the outboard side 16. However, also not equally sized and positioned groves 7 may be provided.

As shown in FIG. 8, the groove 8 is defined by a radial width RW between the two edges 7a of the protrusion 7 delimiting the groove 8 in the radial direction and an axial depth AD in the axial direction at a deepest point of the groove 8. In the embodiment shown, the radial width RW Is constant throughout the extension of the groove 7 in the protrusion 8. Nevertheless, the radial width RW may also be variable.

The protrusion 7 has an axial height AH at the edges 7a of the protrusion 7 delimiting the groove 8 in the radial direction. The axial depth AD of the groove 8 is at least 30% of the axial height AH of the protrusion 7, preferably about 40% of the axial height AH of the protrusion 7. Further, the axial depth AD of the groove 8 may be up 70% of the axial height AH of the protrusion 7.

A radial width RW of a respective groove 8 in this embodiment equals two times the size of the axial depth AD of the groove 8. The protrusion 7 of this embodiment further comprises a protrusion chamfer 7' as can also be seen in FIG. 8.

FIG. 6 and especially FIG. 7 show the narrow teeth 3 of this embodiment, the narrow teeth 3 not comprising any protrusions 7 or grooves 8.

As is visible in FIGS. 1, 2, 8 and 9, each tooth of the plurality of teeth 2, 3 has a front flank 5 and a rear flank 6. The front and rear flanks 5, 6 are defined in respect to the drive direction DD of the chain ring 1. Between each front flank 5 of the plurality of teeth 2, 3 and the rear flank 6 of each respective adjacent tooth of the plurality of teeth 2, 3, a valley is 4 is provided.

The root circle 11 is defined in respect to the lowest point of the valley 4 as seen in the radial direction.

As known in the art, the root circle 11 describes a closed curve, in the shown embodiment a circle, around the chainring 1, in which the plurality of teeth 2, 3 is rooted in. The teeth 2, 3 extend outwardly from the root circle 11. Obviously, the root circle 11 follows the shape of the chainring 1, and in an elliptical chainring (not shown) the root circle 11 will have a matching elliptical outline.

The root circle 11 of the first embodiment of FIGS. 1 to 9 is substantially tangent to the respective maximum depths of the valleys 4 between the teeth 2, 3 of the chainring 1. In the case of the circular chainring 1 shown in FIG. 2 the root circle 11 has substantially a circular shape while being substantially tangent to the respective maximum depths of the valleys 4 between the teeth 2, 3 of the chainring 1. In an elliptic chainring (not shown) the root circle 11 substantially follows the elliptical form of the chainring 1 while still being substantially tangent to the respective maximum depths of the valleys 4 between the teeth 2, 3 of the chainring 1.

With further reference to FIGS. 1 to 9 it should be noted that the chainring 1 is domed at the inboard side 1. The chainring 1 includes a central mounting portion 12, a slanted section 13 and a planar section 14 in which the mounting portion 12 is provided. The domed configurations provide for advantages, as a spider for adjusting the chain line can be avoided as an additional part. FIG. 1 further indicates the top driving position TDP at which a not shown chain roller engages the chainring 1 and the bottom release position RBP, at which the not shown chain roller exists the chainring.

Second Embodiment

With reference to FIGS. 10 to 17, a second embodiment of the inventive bicycle chainring 1 is described.

The second embodiment is distinguished from the first embodiment in that the groove 8 is shaped with a curved cross section, in particular a semicircular circular cross-section as can be best seen in FIGS. 14 and 17. Further, the axial depth AD of the groove 8 is preferably about 40% of the axial height AH of the protrusion 7 or at least 40% up to 70% of an axial height AH of the protrusion 7.

The invention as presently described is particularly advantageous in terms of its technical effects. In fact, as explained, due to the grooves provided in the protrusions of the wide teeth of the present Invention, the same scrape the dirt from the chain links or plates of the chain and hence improve functionality and durability. Field tests carried out on chainring with grooves on the protrusions of the wide teeth in muddy conditions showed that such chainrings dropped the chain only once in 10 consecutive tests, while chainrings without the grooves, as disclosed for instance in the above cited prior art, in the same conditions dropped 3 times. This was an improvement of 300%.

The foregoing explanation of the embodiments describes the present invention exclusively in the context of examples. Of course, individual features of the embodiments can be freely combined with each other, provided that this is technically reasonable, without leaving the scope of the present invention.

LIST OF REFERENCE SIGNS

1 Chainring
2 Wide tooth
3 Narrow tooth
4 Recess
5 Front flank
6 Rear flank
7 Protrusion
7a Edge of the protrusion
7' Protrusion chamfer
8 Groove
9 Side surface
10 Top land
11 Root circle
12 Central mounting portion
13 Slanted section
14 Planar section
15 Outboard side
16 Inboard side
AD axial depth
RW radial width
DD Drive Direction
TDP Top driving position
BRP Bottom release position
P Plane

The invention claimed is:

1. A bicycle chainring for engagement with a drive chain provided with rollers, the bicycle chainring comprising:
a plurality of teeth extending radially from a periphery of the chainring, wherein the plurality of teeth comprises a plurality of narrow teeth and a plurality of wide teeth, wherein each tooth comprises a front flank and a rear flank with respect to a drive direction and two opposing side surfaces,
wherein at least one side surface of each wide tooth comprises a protrusion extending therefrom in an axial direction of the chainring,
wherein each protrusion comprises a respective groove arranged halfway between a top land of the respective wide tooth and a root circle of the respective wide tooth, wherein the groove extends throughout the protrusion in a direction substantially parallel to the top land.

2. The bicycle chainring according to claim 1, wherein each side surface of each wide tooth comprises a respective protrusion.

3. The bicycle chainring according to claim 2, wherein the respective grooves in the opposing side surfaces of a wide tooth are equally sized.

4. The bicycle chainring according to claim 2, wherein the respective grooves in the opposing side surfaces of a wide tooth are differently sized.

5. The bicycle chainring according to claim 1, wherein the groove is shaped in a circular, an elliptical, a triangular, a trapezoidal or a rectangular form in cross-section, as seen in a tangential direction of the chainring, wherein the groove is preferably shaped in a triangular form.

6. The bicycle chainring according to claim 1, wherein the groove is defined by a radial width between two edges of the protrusion delimiting the groove in the radial direction and an axial depth in the axial direction at a deepest point of the groove, wherein the radial width is constant throughout the extension of the groove in the protrusion, and wherein preferably a ratio between the radial width of the groove and the axial depth of the groove is between 2 to 1 and 3 to 1.

7. The bicycle chainring according to claim 1, wherein the groove is defined by a radial width between two edges of the protrusion delimiting the groove in the radial direction and an axial depth in the axial direction at a deepest point of the groove, wherein the protrusion has an axial height at the edges of the protrusion delimiting the groove in the radial direction, and wherein the axial depth of the groove is from at least 30% of the axial height of the protrusion up to 70% of the axial height of the protrusion, preferably from about 40% of the axial height of the protrusion up to 70% of the axial height of the protrusion, and further preferably about 30% or 40% of the axial height of the protrusion, and wherein preferably the radial width is constant throughout the extension of the groove in the protrusion.

8. The bicycle chainring according to claim 1, wherein the groove is defined by a radial width between two edges of the protrusion delimiting the groove in the radial direction and an axial depth in the axial direction at a deepest point of the groove, wherein the two edges delimiting the groove are arranged symmetrically about a plane extending halfway between the top land of the respective wide tooth and the root circle of the respective wide tooth.

9. The bicycle chainring according to claim 1, wherein the plurality of teeth comprises an even number of teeth.

10. The bicycle chainring according to claim 1, wherein the plurality of wide teeth and the plurality of narrow teeth are arranged in an alternating manner, wherein preferably each wide tooth is followed by a narrow tooth and/or each narrow tooth is followed by a wide tooth.

11. The bicycle chainring according claim 1, wherein the plurality of wide teeth and the plurality of narrow teeth are arranged in an alternating manner, wherein each wide tooth is followed by three narrow teeth.

12. The bicycle chainring according to claim 1, wherein the chainring is circular or oval.

13. The bicycle chainring according to claim 1, wherein the chainring is planar or domed.

14. The bicycle chainring according to claim 1, wherein at least one protrusion comprises a chamfer facing the root circle.

15. A bicycle comprising a bicycle chainring according to claim 1.

* * * * *